Dec. 28, 1965  J. R. DE PRIEST  3,226,540
HOT BOX DETECTOR ALARM CIRCUIT
Filed Oct. 24, 1961  6 Sheets-Sheet 1
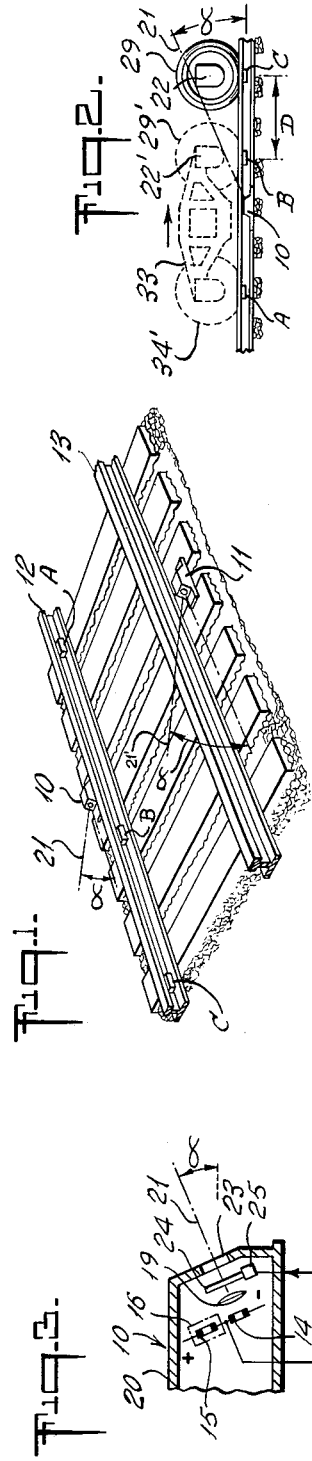
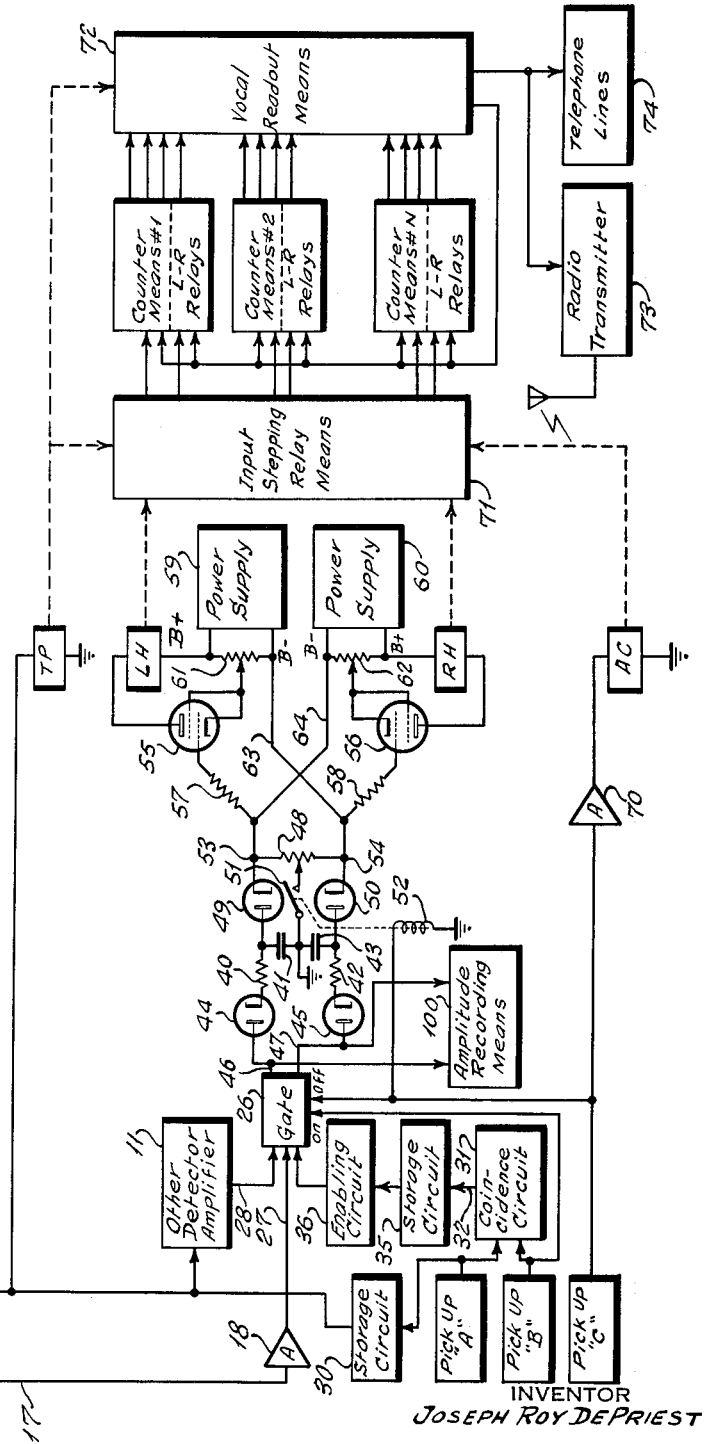
INVENTOR
JOSEPH ROY DE PRIEST
BY Roy C. Hopgood
ATTORNEY Dec. 28, 1965  J. R. DE PRIEST  3,226,540

HOT BOX DETECTOR ALARM CIRCUIT

Filed Oct. 24, 1961  6 Sheets-Sheet 2

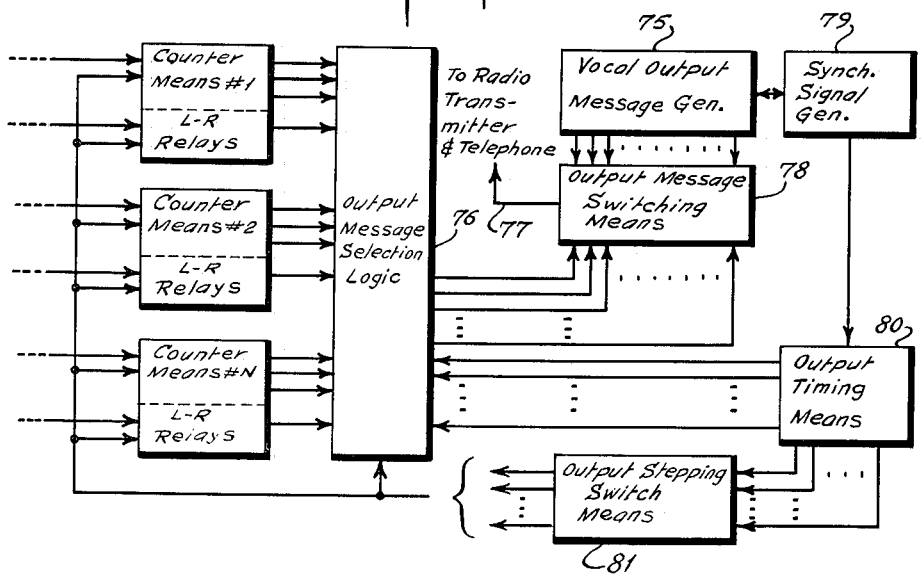

Fig. 4.

| VOICE CHANNEL | TIME INTERVAL | | | | | | | | | | | |
|---|---|---|---|---|---|---|---|---|---|---|---|---|
| | 1T | 2T | 3T | 4T | 5T | 6T | 7T | 8T | 9T | 10T | 11T | 12T |
| A | SEA-BOARD | RAIL-ROAD | RICE-BORO | GEOR-GIA | FIRST | HOT BOX | LEFT | SIDE | ZERO | ZERO | ZERO | |
| B | | | | | SECOND | | RIGHT | | ONE | ONE | ONE | |
| C | | | | | THIRD | | | | TWO | TWO | TWO | |
| D | | | | | FOURTH | | | | THREE | THREE | THREE | |
| E | | | | | | | | | FOUR | FOUR | FOUR | |
| F | | | | | | | | | FIVE | FIVE | FIVE | |
| G | | | | | | | | | SIX | SIX | SIX | |
| H | | | | | | | | | SEVEN | SEVEN | SEVEN | |
| J | | | | | | | | | EIGHT | EIGHT | EIGHT | |
| K | | | | | | | | | NINE | NINE | NINE | |
| S A | ON | OFF | ON | OFF | ON | OFF | ON | OFF | ON | OFF | ON | OFF |
| S B | OFF | ON | ON | OFF | OFF | ON | ON | OFF | OFF | ON | ON | OFF |
| S C | OFF | OFF | OFF | ON | ON | ON | ON | OFF | OFF | OFF | OFF | ON |
| S D | OFF | OFF | OFF | OFF | OFF | OFF | OFF | ON | ON | ON | ON | ON |

Fig. 5.

INVENTOR
JOSEPH ROY DE PRIEST
BY Roy C. Hopgood
ATTORNEY

Dec. 28, 1965   J. R. DE PRIEST   3,226,540
HOT BOX DETECTOR ALARM CIRCUIT
Filed Oct. 24, 1961   6 Sheets-Sheet 6

INVENTOR
JOSEPH ROY DE PRIEST
BY Roy C. Hapgood
ATTORNEY

United States Patent Office 3,226,540
Patented Dec. 28, 1965

3,226,540
HOT BOX DETECTOR ALARM CIRCUIT
Joseph R. De Priest, Richmond, Va., assignor to Servo Electronic Switch and Signal Company, Hicksville, N.Y., a corporation of New York
Filed Oct. 24, 1961, Ser. No. 147,317
19 Claims. (Cl. 246—169)

This invention relates to an improved hot box detector circuit of the type which is mounted alongside a railroad track to automatically detect overheated journal boxes in passing trains and to produce an alarm signal indicating the presence and location of the overheated journal boxes. The invention is characterized by a novel vocal alarm circuit which reports the presence and location of the hot boxes to the crew of a passing train and to the train dispatcher by means of an uncoded verbal message which can be understood by any listener.

Hot box detector alarm circuits per se are old in the art, but in the past it has been the practice to signal the presence of a hot box by means of an alarm bell or light and to indicate the location of the hot box visually on a recording graph or counter which was driven by the hot box detector circuit. In some installations the alarm light and counter were located near the hot box detector site and were operated automatically by the hot box detector circuit. In these installations the train crew would watch for the alarm light, and when it flashed on they would stop the train, go to the trackside recorder or counter to determine the location of the hot box, and then repair the hot box. In other installations the alarm light and counter were located in the train dispatcher's office, and the dispatcher would signal the train to stop when he received a hot box alarm signal. In these installations the train crew would stop the train on receipt of the dispatcher's signal, call the dispatcher from a trackside telephone to determine the location of the hot box, and then repair the hot box.

Although these prior art hot box detector alarm circuits operated satisfactorily in some applications, it is desirable in many applications to report the location of the hot box directly to the train crew immediately after the hot box has been detected so that they will know the location of the hot box before the train is stopped. It is also desirable to simultaneously report the presence and location of the hot box to the train dispatcher so that he will be advised of the impending train stoppage, and to make both reports in an uncoded verbal message which can be understood by any listener.

Accordingly, one object of this invention is to provide a hot box detector alarm circuit which reports the presence and location of hot boxes directly to the crew of a passing train.

Another object of this invention is to provide a hot box detector alarm circuit which reports the presence and location of hot boxes directly to the crew of a passing train immediately after the location of the hot boxes has been determined by the hot box detector circuit.

An additional object of this invention is to provide a hot box detector alarm circuit which simultaneously reports hot boxes to the crew of a passing train and to the train dispatcher.

A further object of this invention is to provide a hot box detector alarm circuit which indicates the presence and location of hot boxes by means of an uncoded verbal message which can be conveniently transmitted to the crew of a passing train via a low power voice radio link and to the train dispatcher via existing trackside telephone wires.

Another object of this invention is to provide a hot box detector alarm circuit which signals the presence and location of hot boxes by means of uncoded verbal messages which can be understood by any listener.

Yet another object of this invention is to provide a hot box detector alarm circuit which is more effective than those heretofore known in the art.

Other objects and advantages of this invention will become apparent to those skilled in the art from the following description of one specific embodiment thereof, as illustrated in the attached figures, in which:

FIG. 1 is a perspective view of a section of railroad track containing a pair of heat responsive detector elements and a plurality of wheel pick-up devices mounted therealong;

FIG. 2 is a side view of the railroad track shown in FIG. 1 indicating the placement of the heat responsive detectors and wheel pick-up devices with respect to a standard journal box;

FIG. 3 is a partial schematic diagram of one illustrative hot box detector alarm circuit of this invention;

FIG. 4 is a more detailed block diagram of the vocal readout means indicated in FIG. 3;

FIG. 5 is a chart showing one suitable vocal output program and synchronizing system for the message generator of FIG. 4;

Figure 6:
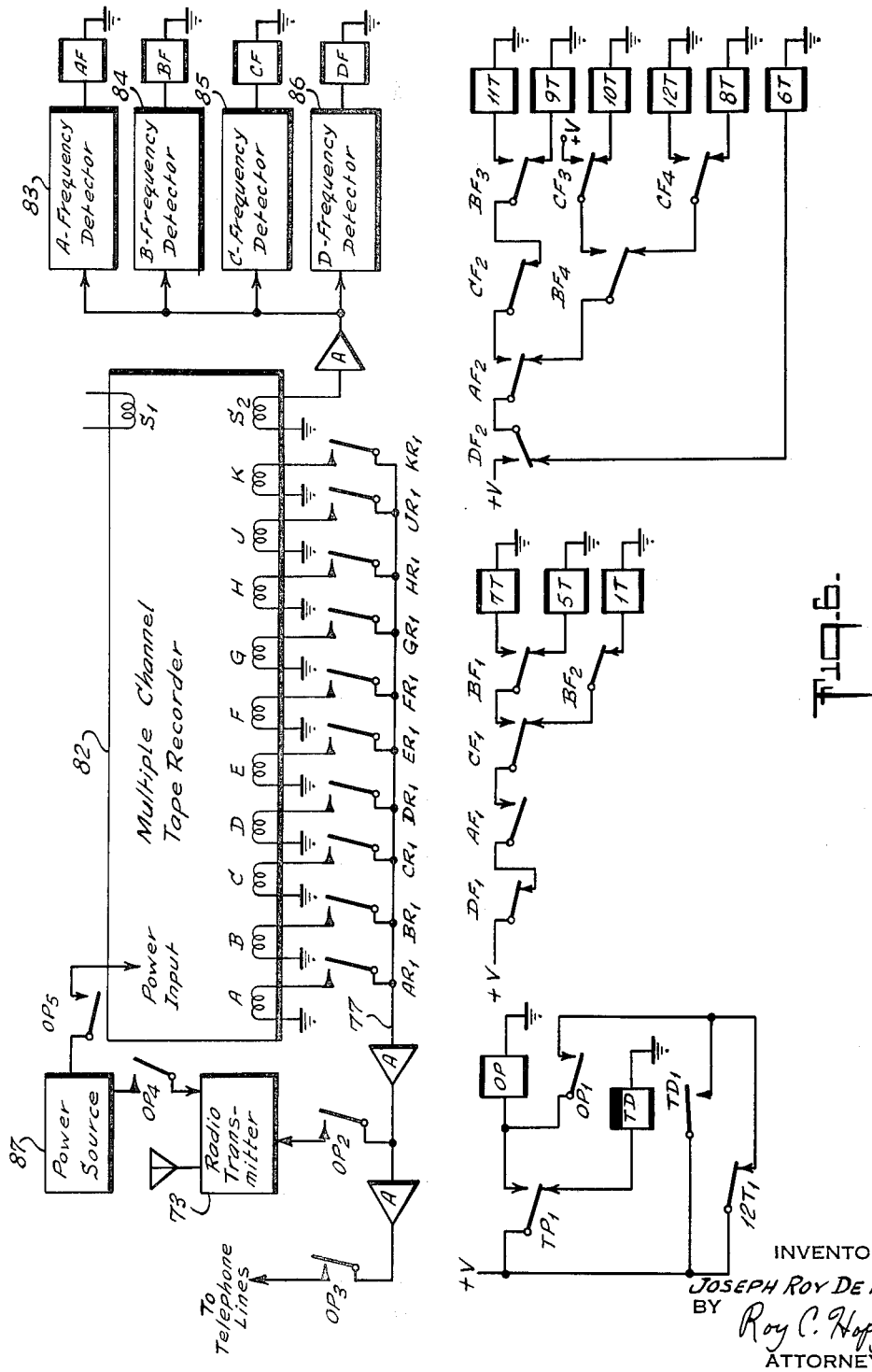
FIG. 6 is a partial schematic diagram of one suitable message generator and synchronizing system which are programmed in accordance with the chart of FIG. 5.

This invention is an improvement over prior art hot box detector alarm circuits such as disclosed, for example, in U.S. Patent No. 2,963,575, which was issued on December 6, 1960, to William M. Pelino and Harold Remz for a "Hot Box Detector Alarm Circuit." Although this invention differs radically from the Pelino device in the alarm portions of its circuitry, it utilizes the same basic hot box detector circuits disclosed in the above noted Pelino patent, and FIGS. 1, 2, and the left hand portion of FIG. 3 are therefore copied from FIGS. 1, 2, and 3 of the Pelino patent.

Referring to FIGS. 1, 2, and 3, this invention is shown in application to plural detector units 10–11 fixedly mounted alongside the right of way and on opposite sides of a given section of longitudinally extending track, comprising rails 12–13. The detector units 10–11 may be exact duplicates of each other, and therefore in FIG. 3 the important parts of the detector 10 are shown in greater detail, whereas those within the detector 11 are merely schematically indicated by a block designation. Each of the detector units may include an active heat-responsive cell 14, such as a so-called thermistor flake, shown connected in a bridge circuit employing a second or compensator cell 15, shielded by means 16 from incident radiation and therefore responsive only to ambient temperature.

As indicated, the cells 14–15 are placed in a bridge circuit the arms of which are shown oppositely polarized, as by application of positive biasing voltage to the outer terminal of cell 15 and negative biasing voltage to the outer terminal of the cell element 14. Bridge output is available in line 17 to pre-amplifier means 18, which may be contained within the housing of the detector unit 10. As indicated, similar components are provided at detector and amplifier means 11.

At detector unit 10, infrared-transmitting optics, such as the lens 19, is so mounted within the detector housing 20 as to image the active cell 14 on a generally upwardly inclined axis 21 (having an elevation angle α), and preferably focused at the horizontal plane of passing journal boxes, such as the box 22 (FIG. 22) for freight-car rolling stock; detector 11 has a similarly inclined response axis 21'. A full discussion of orientation in the manner indicated for the axis 21 in reference to journal boxes, as at 22, is contained in U.S. Patents No. 2,880,309 and Re. 24,983 so that further detail on that subject is not presented herein. The imaging axis 21 is shown to pass through a localized opening 23 in the housing 20, and shutter means 24 between the lens 19 and the housing opening 23 provides mechanical protection for the lens element and other internal parts of the system, as long as no trains are passing. The shutter 24 is merely schematically designated in FIG. 3 and may comprise a simple blade, actuated by solenoid means 25, as will be understood.

As indicated generally above, this detector circuit relies importantly on the operation of a gating means 26 accommodating the separate outputs 27–28 of the respective detectors 10–11 and assuring that said detectors effectively look only at journal boxes, that is, to the exclusion of all other matter passing the field of view of the respective detector-response axis. To operate the gate, this detector circuit uses electromagnetic wheel trips which may be and preferably are of the variety disclosed in U.S. Patent No. 2,973,430, wherein a polarized magnetic air gap is established in the path of oncoming wheel flanges so that the passage of each wheel flange automatically develops a suitably characterized pulse, clearly identifying the instant at which each wheel center passes a particular point along the track.

The wheel-trip location is so related to the placement of the detectors 10–11 and their respective response axis 20–21' that gating occurs only when the axis 20–21' are imaged on opposed journal boxes for the same axle. In the form shown, two such wheel trips (labeled B and C in FIGS. 1, 2 and 3) are employed, the effective spacing D between said trips being determined in the manner specified in greater detail in said U.S. Patent No. Re. 24,988 whereby at the instant for which the phantom outline 29' for a particular truck wheel 29 is symmetrically positioned over the trip B, the optical alignment 21 of the detector 10 is barely tangential to the bottom of the journal box 22 identified at 22'. An instant later, the wheel 29 and box 22 have moved to the position shown in solid outline in FIG. 2, at which time the wheel center is symmetrically positioned with respect to the trip C, and at this time the response axis 21 is just grazing the top corner of the journal box 22. Thus, the gated interval determined by pulses from pickups B and C may be employed first to "turn on" and then to "turn off" the gating function at 26, determining response only to heat radiated by the journal box 22, regardless of the speed of the passing wheel 29. Ordinarily, for a viewing axis 21 or 21' having an elevation of the order of 25° above the horizontal, and for observation of conventional freight-car journals 22, the preferred effective spacing D between the pickups B and C is of the order of 40 inches.

As also explained in said U.S. Patent No. Re. 24,983, the shutter means (24) is actuated to expose the optics on the alignments 21–21' as long as any train is passing the installation. For this purpose, we show the employment of an additional wheel trip identified at A in the drawings. The pickup or trip A may be of the same nature as employed at B and C, and for the situation depicted in FIG. 2 (wherein the aspect of viewing on the passing rolling stock is for a train going away from the detector; in other words, trailing-aspect viewing), the pickup A is preferably spaced ahead of the pickups B and C, as shown. Output pulses from the pickup A are shown to be passed to a relatively long-time constant storage circuit 30, the output of which will be a voltage sufficient to hold open the shutters 24 of the respective detectors 10–11 as long as pulses are generated by the pickup A, and even for the slowest speed trains, down to, say, five miles an hour.

As indicated generally above, this detector system automatically discriminates against locomotives, passenger cars and other railroad rolling stock which is not of standard freight-car wheelbase dimensions. Freight car truck wheelbases are standardized at five and one-half feet, and this detector circuit makes use of the fact that this wheelbase is not encountered in any other type of rolling stock, including locomotives and passenger cars. In FIG. 3 the outputs of both pickups A and B are fed to a coincidence circuit 31 effective to pass in the output line 32 a wheel-trip pulse only when the two wheels of a given truck 33 simultaneously actuate the trips or pickups A and B. In FIG. 2, this condition is illustrated in lightly dashed outline, the wheels being identified at 29–34' for the truck 33, and it will be seen that the preferred spacing, of course, for the trips A–B is the aforesaid wheelbase to be selected, namely, five and one-half feet, being the wheelbase for trucks of standard American freight-car rolling stock.

Coincidence pulses derived in line 32 are shown fed to a storage circuit 35 which is again of the long time-constant variety, as disclosed at 30, and serves to operate enabling means such as a relay 36 for conditioning the gate 26 for operation. In other words, the function of the pickups A and B in combination with the circuits 31–35–36 is to prevent operation of the gate 26 until such time as the first freight-car truck is encountered, and yet to maintain the gate suitably conditioned (once it has been enabled) for the full passage of the freight cars in the train even for slow trains. This means, of course, that for the usual situation in which a locomotive is pulling a train, no locomotive trucks or wheel arrangements will be effective to enable the gate 26, inasmuch as the standard freight-car wheelbase occurs only for freight-cars and not for locomotives; it may also be observed that the standard freight-car wheelbase (5½ feet) is not encountered in passenger rolling stock, so that here too, the gate 26 is not enabled (and, therefore, cannot be opened) for any given train until such time as the first freight-car truck is detected by the coincidence circuit 31.

It so happens that for the particular wheel trip which we have employed in our work to date, the identifying pulse marking the instance of passage of a wheel center past a given location on a track is relatively short compared to the time within which the whole journal box 22 is viewable, namely, the time taken for a train to pass the distance D between pickups B and C. Also, it so happens that, because of axial and other play in the mounting of axles, wheels and trucks, a given freight-car axle will not at all times necessarily be perfectly aligned perpendicular to the gage line of the track. This means that a heat detection pulse derived upon exposure for the detector 10 along the axis 21 may be slightly differently timed (or out of phase) with respect to the corresponding pulse derived for exposure along the axis 21'. Thus any difference evaluation of slightly de-phased pulses of this character could result in failure to obtain a true differential evaluation.

In accordance with this detector circuit, however, any such phase error due to misalignment of the axle with respect to the track are avoided by using the gated interval as the period during which any heat signals developed by detectors 10–11 will be stored or integrated. Thus, if the heat signal for one detector 10 is developed relatively early in the gated interval, compared to the time of development of the heat signal for the other detector 11, the function and effect of the storage means will be to present stored signals of magnitudes reflecting the observed heat signal, but without any phase displacement; thus a simultaneous read-out of the stored information may result in true differential evaluation.

In the form shown in FIG. 3, such storage means comprises two resistance-capacitance networks 40–41 and 42–43 charged by diodes 44–45 connected respectively to two outputs of the gate 26, the output 46 presenting gated signals of intelligence developed only by the cell 14 within the detector 10, and the output 47 similarly presenting gated signals originating at the detector 11. The time constant for charging the capacitors 41–43 is relatively short, that is, in the forward direction for the diodes 44–45. In the reverse direction, of course, the diodes 44–45 block, and therefore the charge is held on each of the capacitors 41–43 until discharge upon read-out.

Read-out is initiated by the closure of relay contacts 51 of relay 52, which is actuated by the output of wheel pickup C. Therefore, once the wheel 29 has traversed the distance D between pickups B and C, the integrated charges at 41–43 will be differentially evaluated, upon transient closure of relay 51 at the instant at which wheel 29 is shown in solid outline in FIG. 2. If journal box conditions are normal, the heat observed on the axis 21 will be substantially the same as that observed on the axis 21′, and the charges at 41 and 43 will be essentially the same, which means that the voltage drop across the halves of divided potentiometer 48 will be approximately equal. If the heat observed on one axis exceeds the heat observed on the other axis, however, the voltage across the corresponding half of potentiometer 48 will exceed the voltage across the other half thereof by an amount proportional to the heat difference. When this voltage difference exceeds a predetermined value, thyratron 55 or 56 will be momentarily fired to indicate the presence of a hot box on the right or left side of the train. The firing threshold of the thyratron is set by potentiometers 61 and 62, as explained more fully in said U.S. Patent No. 2,963,575. This produces a momentary closure of relay RH or LH, whose contacts initiate a counting operation via input stepping relay means 71, which also receives contact closures from relay TP, which is energized as long as a train is passing the detector unit, and relay AC, which is energized momentarily for each axle that passes the hot box detector.

Except for relays TP, LH, RH, and AC, the circuit as thus far described is substantially identical with the prior art hot box detector circuits, and applicant does not allege any novelty for the above described structural elements except as they interact with the novel units of the circuit, which are disclosed in the right hand portion of FIG. 3 and in FIGS. 4 through 9. Referring to the right hand portion of FIG. 3, input stepping relay means 71 drives a plurality of counter means 1 through N each of which has a left-right (L–R) relay associated with it. Stepping relay means 71 gates the axle count pulses from relay AC into each counter as soon as a hot box is indicated by the closure of relay LH or RH, and stores the left-right information in the corresponding L-R relays. Couter means #1 is actuated for the first hot box, counter means #2 for the second hot box, and so on. After the counters have started, they continue to count each axle until the end of the train has passed the detector elements, which is indicated by the de-energization of relay TP. At that time, counter #1 will contain the number of axles between the first hot box and the end of the train, counter #2 will contain the number of axles between the second hot box and the end of the train, and so on. Vocal readout means 72 then examines the contents of each counter in sequence, translates the contents thereof into a verbal message, and transmits the verbal message to the train crew via a low power radio transmitter 73 and to the train dispatcher via existing trackside telephone lines 74. Vocal readout means 72 automatically resets all of the counter circuits after the readout operation has been completed and returns the circuit to its original condition for the next train.

FIG. 4 shows a more detailed block diagram of vocal readout means 72. The novel hot box alarm circuit of this invention is based on a vocal output message generator 75, which is adapted to produce a plurality of verbal output signals including words and numbers, and an output message selection logic 76, which switches the verbal output signals onto an output conductor 77 in time sequence to produce a substantially continuous output message indicating the presence of an abnormally hot journal box and the total number of axles between the hot journal box and the end of the train. This switching is performed via output message switching means 78. The operation of message selection logic 76 is coordinated with the operation of message generator 75 by means of a sync signal generator 79 and output timing means 80, which produce time interval signals correlated with the output word and number signals of message generator 75. Output timing means 80 is also coupled to output stepping switch means 81, which activates counter means 1 through N in time sequence to report the presence and location of each hot box in turn. Output stepping switch means 81, of course, does not switch from one counter to the next until one full output message has been completed.

The operation of the vocal readout means shown in FIG. 4 can be more clearly explained by disclosing several specific circuits which are adapted to be used therein. FIGS. 5 and 6 illustrate one suitable circuit arrangement for vocal output message generator 75, sync signal generator 79, output timing means 80, and output message switching means 78. As shown in FIG. 6, this particular vocal output message generator comprises a multiple channel tape recorder 82 which contains message output channels A through K and a synchronizing channel $S_1$. Channels A through K of tape recorder 80 contain recordings of verbal word and number signals as indicated in chart 5. Each channel of the tape recorder is divided into 12 time intervals 1T through 12T by means of frequency coded synchronizing signals recorded on channel S. Each time interval is defined by a particular combination of four frequencies A through D which are recorded on the synchronizing channel by means of an input winding $S_1$ and are picked up by an output winding $S_2$ whenever the tape recorder is operated. It will be understood, of course, that every output channel of tape recorder 82 operates simultaneously and in synchronism when the tape recorder is activated. In general, the composite output message of this particular circuit arrangement is derived by switching the appropriate tape channel onto output conductor 77 in the proper time interval to produce the desired output message. For example, if output channel A is continuously connected to output conductor 77, the output message will be "Seaboard Railroad, Riceboro, Georgia, first hot box, left side, zero zero zero." If channel B is switched on in time interval 5T in place of channel A, the word "second" will be substituted for the word "first." The other possible combinations of output messages will be readily apparent to those skilled in the art from the chart of FIG. 5.

The sync signals for this particular embodiment of the invention are derived from frequency detector circuits 83 through 86, each of which activates a corresponding output relay AF through DF when the corresponding frequency is present on channel S of the tape recorder. The contact closures of relays AF, BF, CF, and DF are used to activate time interval relays 1T through 12T to define the critical time interval periods. It will be noted in FIG. 6 that no relays are provided for time intervals 2T through 4T in this particular embodiment of the invention, since the first four time intervals are used as a unit to identify the geographical location of the particular hot box detector installation, which in this example is located on the Seaboard Railroad at Riceboro, Georgia. It is necessary, however, to have positive indications for time intervals 5T through 11T since these channels are used in this case to identify the number and location of the hot boxes. The relay contact networks that control relays 1T through 12T are arranged to activate these relays in the corresponding time interval shown in the chart of FIG. 5. For example, in time interval 1T, frequency A is on and frequencies B, C, and D are off. This means that relay AF will be energized in time interval 1T and that relays BF, CF, and DF will be de-energized. Relay 1T will therefore be energized through normally closed contacts $DF_1$, normally open contacts $AF_1$, normally closed contacts $CF_1$, and normally closed contacts $BF_2$. All of the other time interval relays will be de-energized under these conditions, as will be evident from an inspection of their corresponding relay contact inputs.

Tape recorder 82 is energized by relay OP, which connects power source 87 to tape recorder 82 and to transmitter 73, and which connects output conductor 77 to the transmitter and to the telephone line. Relay OP is energized by contacts $TP_1$ of relay TP as soon as the train starts to pass the hot box detector. When relay OP is energized it seals itself closed through contacts $OP_1$ which are coupled to $+V$ through contacts $TD_1$ and $12T_1$. Relay TD is a time delay relay which when energized picks up its contact after three minutes (i.e. three minutes after voltage is applied thereto by contacts $TP_1$). It can be seen therefore that time delay relay TD will pick up contact $TD_1$ three minutes after the end of the train has passed the hot box detector and that relay OP will consequently be de-energized at the start of the next 12T time interval.

Each channel of tape recorder 82 contains a closed loop of tape, and all of the loops are driven continuously in synchronism as long as power is applied to the tape recorder. Therefore the tape recorder will continuously recycle through the program shown in FIG. 5 as long as relay OP is operated. While the train is passing, however, the output message is limited to the phrase "Seaboard Railroad, Riceboro, Georgia" which identifies the geographical location of the hot box detector and gives notice that it is in operation. After the end of the train has passed, as evidenced by the de-energization of relay TP, the hot box identification will be added to this message, and the hot box identification will be repeated until the circuit is turned off by time delay relay TD. The exact method by which this is done will be more apparent from the circuits of FIG. 7 and FIG. 8, which show one suitable counter means, one suitable output stepping switch means, and one suitable output message selection logic which can be used in connection with the circuit of FIG. 6.

Figure 7:
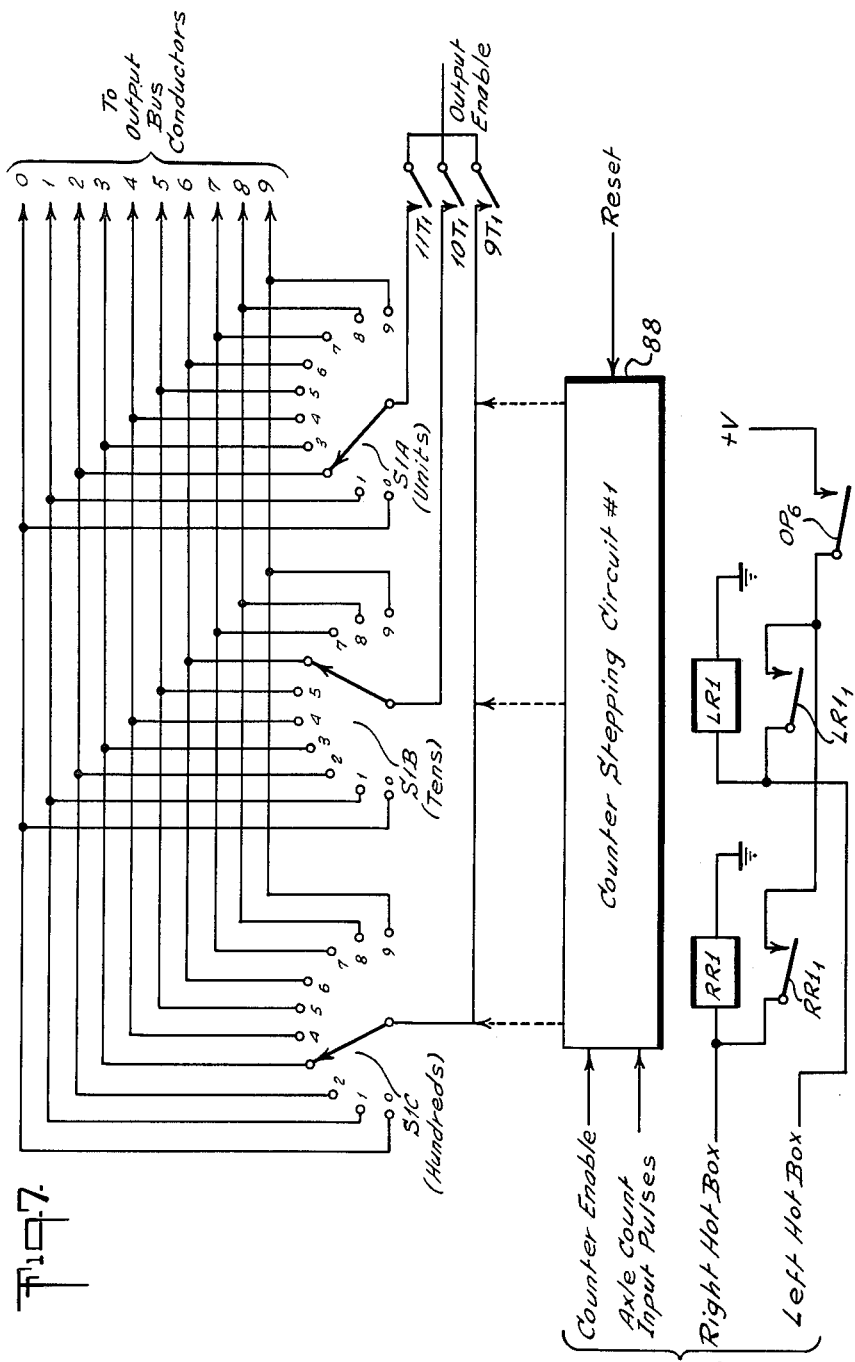
FIG. 7 is a partial schematic diagram of one suitable hot box counter circuit.

Referring to FIG. 7, one suitable counter means comprises three stepping switches S1A through S1C which are driven by a counter stepping circuit 88. Counter stepping circuit 88 can be any suitable stepping switch motor circuit which advances switch S1A by one unit for each axle count input pulse and which advances switch S1B by one unit for each ten units of switch S1A and which advances switch S1C by one unit for each ten units of switch S1B. Counter stepping circuit 88 is normally disabled but receives an enable signal from input stepping relay means 71 when the first hot box occurs. At the same time a "right hot box" or "left hot box" signal is applied to relays RR1 and LR1 from input stepping relay means 71. These signals are voltages which energize the corresponding relay, which then seals itself closed and remains closed as long as the operating relay OP remains energized. After the counter stepping circuit 88 has been enabled, it will begin to count axle input pulses and continue until the end of the train passes, thus counting the number of axles between the corresponding hot box and the end of the train. This axle count will, of course, be represented by the position of the stepping switches, with switch S1A representing the units digit of the total count, and switch S1B representing the tens digit, and switch S1C representing the hundreds digit. These numbers are read out in sequence by applying an output enable voltage to the arm of the stepping switches through timing relay contacts $9T_1$, $10T_1$, and $11T_1$. Referring to the chart of FIG. 5, it will be seen that time interval 9T corresponds to the hundreds digit of the axle count, and that time interval 10T corresponds to the tens digit, and that time interval 11T corresponds to the units digit. When a voltage is applied to the arm of any of the stepping switches, it is transmitted to one of ten output conductors 0 through 9, which are in turn coupled to output bus conductor as will be described later in connection with FIG. 8.

Each of the counter means 1 through N in FIGS. 3 and 4 and their corresponding L–R relays can comprise a stepping switch circuit such as shown in FIG. 7, and each of these counter means will be enabled in turn by input stepping relay means 71 as hot boxes are detected by the detector portion of the circuit. Input stepping relay means 71 can be any suitable relay means for enabling the counter stepping circuit in turn and applying the right or left hot box signals to the associated L–R relays. One circuit of this general type is disclosed in FIG. 4 of the above noted U.S. Patent No. 2,963,575. This particular circuit is designed to operate only from one of the thyratron tubes, but it will be apparent that the circuit can be adapted to operate from both of the thyratron tubes by simply forming an OR circuit with the contacts of relay LH and RH and driving the stepping relays from the OR circuit instead of from one of the thyratrons. It will also be apparent that the same basic stepping relay circuit can be used to switch in sequence to the L–R relays, which are not shown in FIG. 3 of said patent. In addition to the above described relay stepping circuit, there are many other suitable relay stepping circuits which can be used to perform the above described functions, as will be apparent to those skilled in the art, and any suitable circuit can be used which enables counter means 1 through N in sequence in response to the hot box indication and energizes the corresponding left or right relays to indicate the transverse location of the corresponding hot box.

When the end of the train has passed the hot box detector, counter means 1 through 4 will contain the axle count for their corresponding hot boxes and these axle counts are then read out in sequence due to the action of the output stepping motor circuit 89 (FIG. 8) and output stepping switches SOA, SOB, and SOC. Before discussing the detailed operation of the output stepping circuit, however, it should be noted in FIG. 8 that the output conductors 0 through 9 of each counter means are connected in parallel to 10 output bus conductors A through K each of which is coupled to a corresponding output switching relay AR through KR. Relays AR through KR each correspond to a channel A through K of tape recorder 82 (FIG. 5), and the corresponding channel is coupled to output line 77 (FIG. 6) whenever its output switching relay is energized. Thus channel A of the tape recorder 82 will be coupled to output conductor 77 as long as relay AR is energized; channel B will be coupled to output conductor 77 as long as relay BR is energized; and so on.

When a train passes the hot box detector, relay AR (FIG. 8) will be energized immediately through contacts $OP_7$ and $1T_1$ and will seal itself closed through the relay contacts thereunder, the relay contacts under the other output relays, and contacts $5T_1$ and $OP_8$. This sealing circuit is arranged so that relay AR will remain closed until time interval 5T (FIG. 5) when contacts $5T_1$ open and breaks the sealing circuit. As long as the output stepping switches SOA, SOB, and SOC (FIG. 8) remain in their neutral (N) position, all of the output relays will remain de-energized for time intervals 5T through 12T.

On the following cycle of the tape recorder 82, however, relay AR will again be energized for time intervals 1T through 4T by the second closure of contacts $1T_1$ and the second opening of contacts $5T_1$. Thus as long as the train is passing the hot box detector circuit, the message "Seaboard Railroad, Riceboro, Georgia" will be broadcast repeatedly on radio transmitter 73 and through the telephone lines to advise the train crew and the train dispatcher that a train is passing the hot box detector located on the Seaboard Railroad at Riceboro, Georgia.

After the end of the train has passed the hot box detector, relay TP becomes de-energized and contacts $TP_2$ (FIG. 8) and $TP_1$ (FIG. 6) to initiate the hot box readout cycle of the output circuit. The closure of back contact $TP_1$ start the three-minute time delay relay TD, and the closure of back contact (FIG. 8) $TP_2$ enables output stepping motor circuit 89, which then drives the output stepping switches SOA, SOB and SOC by one increment every time contacts $12T_2$ close. Therefore in the 12T time period which follows the de-energization of relay TP, the output stepping switches SOA, SOB and SOC will be advanced from their neutral (N) position to their first position. Switch SOA will then read out the transverse location of the hot box, i.e. right or left side; switch SOB will read out the number of the hot box, i.e. first, second, third, or fourth; and switch SOC will enable the counter means in turn to read out the axle count for that particular hot box. Suppose, for example, that the first hot box is located on the right hand side of the train 362 axles from the rear. The output sequence for this example would proceed as follows: relay AR would be energized in the first four time intervals, as described previously, to produce the message "Seaboard Railroad, Riceboro, Georgia." At the start of the fifth time interval, the sealing circuit to relay AR would be broken by the opening of contacts $5T_1$ but at the same time relay AR would receive a voltage through contacts $5T_2$ and switch SOB. Therefore, relay AR will remain energized through time interval 5T to add the word "first." On the sixth time interval, relay AR would again be held energized by the closure of contacts $6T_1$ or $6T_2$ to add the word "hot box." In the seventh time interval relay AR would drop out and relay BR would be energized through contacts $7T_1$ to add the word "right." In time interval 8T, relay BR would drop out and relay AR would be energized again through contacts $8T_1$ or $8T_2$ to add the word "side." During the ninth, tenth, and eleventh time periods, voltage would be applied in time sequence to switches S1C, S1B, and S1A of counter means number 1, as indicated in the circuit of FIG. 7, which would energize relays DR, GR, and CR in sequence to read out the number 362 as the axle count for the first hot box. In the twelfth time interval, contacts $12T_2$ close, thus driving switches SOA, SOB, and SOC to their second position. The same output sequence is then repeated except, of course, for the difference in information which depends upon the location of the second hot box. When the second hot box is read out, the word "second" is substituted for the word "first" in the readout by de-energizing relay AR and energizing relay BR at the start of the fifth time interval. Relay AR is de-energized by the opening of contacts $5T_1$, and relay BR is energized by a voltage applied through contacts $5T_3$ and switch SOB. After the second hot box had been read out, the output stepping switches would be driven to the third position to read out the location of the third hot box, and then to the fourth position to read out the location of the fourth hot box. When the third hot box is read out, the word "third" is provided by energizing relay CR in the fifth time interval by means of a voltage applied through contacts $5T_4$ and switch SOB. For the fourth hot box, the word "fourth" is provided by energizing relay DR in the fifth time interval by means of a voltage applied through contacts $5T_5$ and switch SOB.

After all of the counters have been read out, the stepping switches will be moved back to their neutral position and will repeat the output cycle, reading out the location of each hot box in sequence for a second time. The output will continue to be repeated as long as the operating relay OP remains energized. At the end of the three-minute time delay period, however, contacts $TD_1$ (FIG. 6) will open and the latch back circuit of relay OP will be broken by contacts $12T_1$ in the next 12T time interval. This turns off tape recorder 82 and initiates a reset signal in output stepping motor 89 to reset switches SOA, SOB, and SOC to their neutral (N) position and to reset all of the counter means to their zero position. This returns the entire output circuit to its original state and prepares it to examine the next train for hot boxes.

Figure 8:
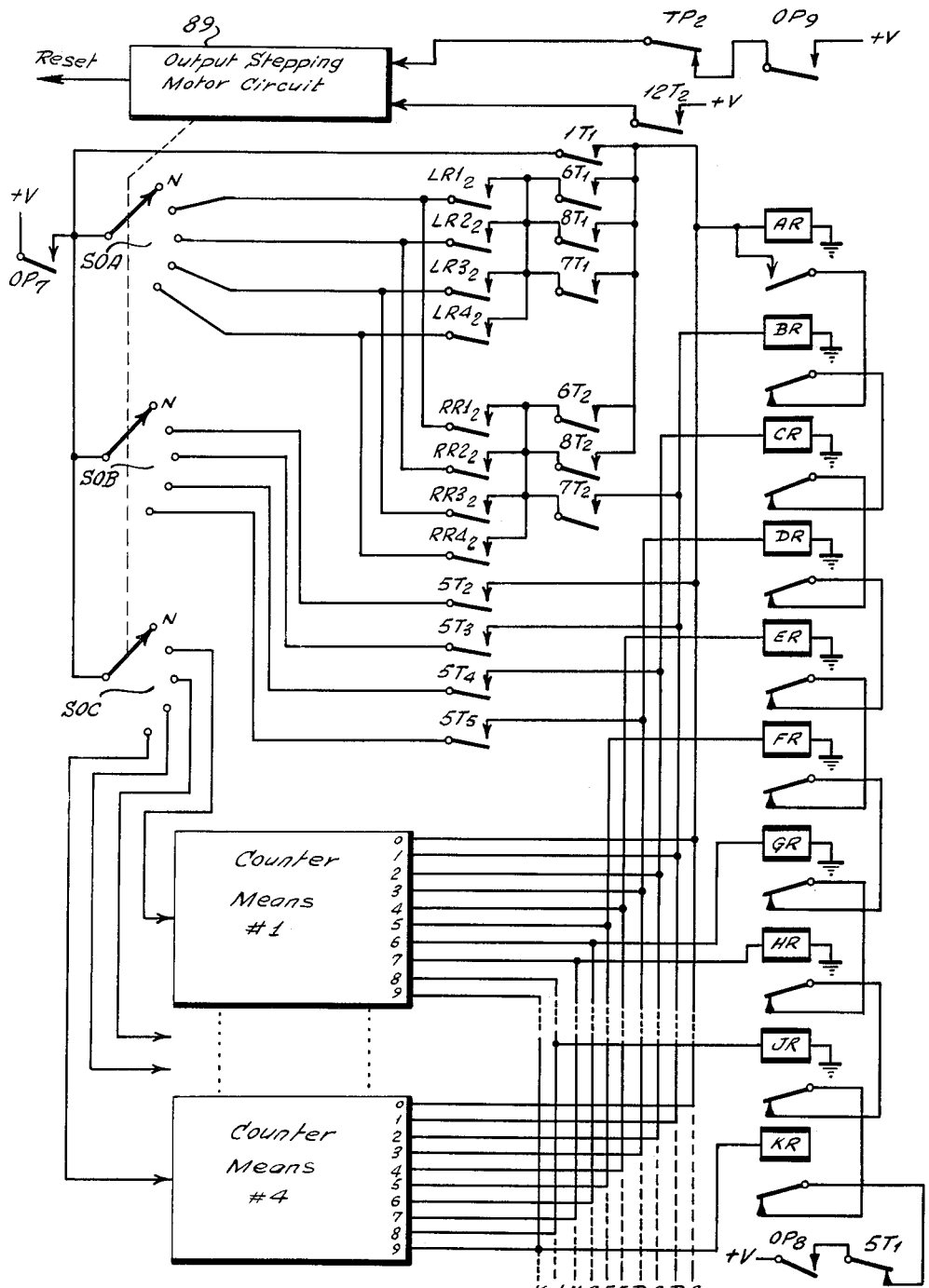
FIG. 8 is a partial schematic diagram of one suitable vocal output circuit which can be used in connection with the circuits of FIGS. 6 and 7.

In the circuit of FIG. 8, it will be noted that output stepping motor circuit 89 operates to read out the contents of each counter means regardless of whether or not any hot boxes have been detected. In applications where this blanket readout is objectionable, however, the output stepping motor circuit of FIG. 9 can be used to skip readout of counters which do not contain a hot box axle count. In this circuit, the stepping switches are of the spring-magnet driven type, in which the drive spring is cocked by energization of an electromagnet P and released when the electromagnet is de-energized. When the drive spring is released, it advances the stepping switches by one position.

Figure 9:
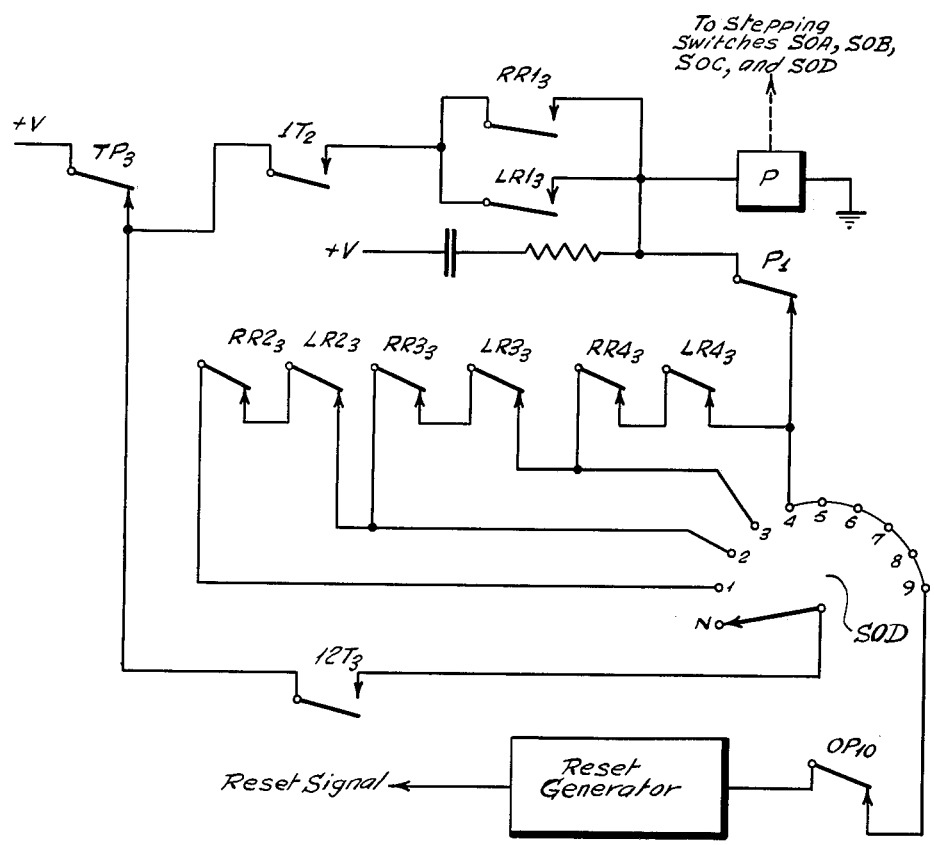
FIG. 9 is a partial schematic diagram of an output stepping motor circuit which can be used in the circuit of FIG. 8.

In the circuit of FIG. 9, a fourth output stepping switch deck SOD has been added to automatically drive the stepping switch past any counter positions which have not recorded a hot box. If the first hot box has been recorded, electromagnet P will be energized in the first time interval following the de-energization of relay TP via contacts $TP_3$, $1T_2$, and $RR1_3$ or $LR1_3$. Shortly after it has been energized, electromagnet P de-energizes itself via contacts $P_1$ and advances the stepping switches from their N to their 1 position. It will be noted that the stepping switches will remain in their N position if no hot box has been recorded, thus eliminating the output stepping cycle when their is nothing to report.

If four hot boxes have been recorded, the stepping switches will be advanced by one unit in each 1T time interval, as described above, until the stepping switches are in their 5 position, at which time the electromagnet P will be rapidly pulsed during the next 12T time interval until it returns to the N position. The frequency of the pulses is determined by the make-break time of contacts $P_1$, which is short enough to advance the switches through a complete cycle in one time interval. When the switches return to their N position, they will repeat the above described cycle, reporting the four hot boxes a second time and then pulsing back to the N position. When contacts $OP_{10}$ close, after the three minute reporting interval has elapsed, a reset signal will be generated by reset generator 90 when switch SOD reaches the 5 position.

If less than four hot boxes have been recorded, the above described pulsing operation will begin after the last recorded hot box has been read out, due to the normally closed LR and RR contacts coupled to positions 1, 2, and 3 of switch SOD. The action of these switches in advancing the pulsing cycle will be apparent to those skilled in the art. Thus the circuit of FIG. 9 only reads out the counters which have been activated by a hot box alarm signal, and automatically skips over any counters which have not received a hot box signal. Therefore it will be preferable to the output stepping circuit shown in FIG. 8 in many applications.

Although the above described circuits are only one example of the many suitable circuits which can be used to mechanize the invention, the particular circuits shown do have several notable advantages. For example, in FIG. 8 it will be noted that any number of counter means can be added to the output circuit without requiring any change in the tape recorder or the output timing circuit or the output bus conductor A through K. The additional counter means would require only an additional output stepping switch position on each of the three output stepping switches SOA, SOB, and SOC. Therefore the particular circuit shown in FIG. 8 has the advantage that it can be adapted to accommodate any desired number of hot box counters with nothing more than minimal circuit alteration. In the counter circuit of FIG. 7, a minimum number of relay contacts are used to perform the output function and all of the stepping switches can be directly coupled to ten common output lines which in turn can be directly coupled to the ten common bus conductors. This circuit arrangement, which reduces the number of conductors to a minimum, is made possible by routing the output enable signals first through the output stepping switch and second through the contacts 9T, 10T, and 11T to the arm of the corresponding counter switch. In addition, the particular vocal output message generator shown in FIG. 6 and the particular sync generator and output timing means shown therein have the advantages of simplicity, reliability, accuracy, and low cost. Furthermore, it will be noted that the particular circuits shown in FIG. 6 can also be generalized to include any desired number of message channels and that the messages on the tape recorder can be easily changed to any desired form.

It should be understood, however, that this invention is by no means limited to the specific circuits disposed herein, since many modifications can be made in the circuits disclosed without departing from the basic teaching of this invention. For example, in place of the relay logic circuits shown in these drawings, solid state electronic logic circuits could be used without effecting the fundamental operation of the invention. And although the tape recorder of this particular output circuit is operated continuously while the train is passing, it will be clear to those skilled in the art that the recorder could be operated intermittently, if desired, and also that the particular verbal sequence shown in the drawings could be changed to any other suitable sequence. Furthermore, although a frequency coded timing system is used in this particular embodiment of the invention, it will be clear that a pulse coded timing system could just as well be used in other embodiments of the invention. In addition, the stepping switches could be replaced by diode switching matrices driven by flip-flop counters, if desired, and the L–R relays could be replaced by flip-flops or any other suitable information storage device. These and many other modifications will be apparent to those skilled in the art, and this invention includes all modifications falling within the scope of the following claims.

I claim:

1. In combination with a circuit for detecting hot journal boxes on a train; means responsive to said detection for counting train axles between the hot journal box and the end of the train; a vocal output message generator for producing a plurality of verbal output signals including predetermined words and numbers; output message selection means, coupled between the output of said vocal output message generator and the output of said axle counter means, for selecting a time sequence of output words and numbers signifying the presence of abnormally hot journal box and the total number of axles between said abnormally hot journal box and one end of said train.

2. The combination defined in claim 1 wherein said vocal output message generator comprises a multiple channel vocal output device, and also including an output conductor; output message switching means coupled between said vocal output message generator and said message selection means, for coupling predetermined channels of said vocal output device to said output conductor in time sequence in accordance with signals received from said output message selection means; and synchronizing means coupled between said vocal output message generator and said output message selection means, for coordinating the operation of said vocal output message generator and said output message selection means so as to produce a substantially continuous verbal output message on said output conductor indicating the presence of an abnormally hot journal box and the total number of axles between said abnormally hot journal box in one end of said train.

3. The combination defined in claim 2 wherein said synchronizing means comprises a sync signal generator, coupled to said vocal output message generator, for producing sync signals which are correlated in time with the output word and number signals of said vocal output message generator; and output timing means, coupled between said sync signal generator and said output message selection means, for producing a substantially continuous sequence of time interval signals which are synchronized with the word and number message signal outputs of said vocal output message generator.

4. The combination defined in claim 1 also including means responsive to the passing of the rear end of a train, for initiating the readout of said axle counter means, thereby reporting the presence and location of said abnormally hot journal box immediately after said train passes by said location.

5. The combination claimed in claim 1 for detecting a plurality of hot boxes comprising means responsive to said detector circuit for counting axles between each successive hot journal box and the end of the train; and means for sequentially coupling each of said counting means to said output message selection means to provide a plurality of output messages, each indicating the presence and location of a corresponding abnormally hot journal box.

6. The combination claimed in claim 5 wherein said sequential coupling means is responsive to the end of each complete message signifying the presence and location of a hot journal box.

7. The combination claimed in claim 1 further comprising means responsive to the initial passing of a train for immediately indicating the presence and functioning of the combination.

8. The combination claimed in claim 7 wherein said train-passage responsive means comprises means for initiating the time sequence of output words.

9. The combination claimed in claim 8 further comprising means for recycling the sequence of output words and numerals signifying the presence of an abnormally hot journal box and the total number of axles between said abnormally hot journal box and one end of said train for a predetermined period after the passage of a train.

10. A vocal counter circuit in combination with a circuit for detecting hot journal boxes comprising: counter means for receiving input signals and indicating the total number applied thereto; a vocal message generator comprising a plurality of message channels, equal in number to at least the numeric base of said counter, each broken into a discrete time zone, each zone representing a vocal digit; means for cycling said generator channels in common sequentially through their time zones; an output conductor; means for enabling sequential counter digit orders with sequential time zones; means responsive to the count in said counter for sequentially coupling selected channels to said conductor upon the cycling of said generator; means coupled to said counter means and responsive to said hot journal box detector for applying an input signal to said counter means for each train axle following the detection of a hot box; and means responsive to the complete passage of a train for recycling the message generator for a predetermined period.

11. The combination claimed in claim 10 further comprising means responsive to the entry of a train into the zone in which said hot box detector is operating for immediately indicating the presence and functioning of the combination.

12. The circuit claimed in claim 11 wherein said means for immediately indicating the function of the combination comprises word time zones in said message generator sequentially preceding the digit time zones; and means responsive to the zone entry of a train for initiating the reading of said word time zones.

13. A hot box detector alarm circuit comprising heat responsive means mounted in a location adjacent to a railroad track, for receiving heat from the journal boxes of a train moving along said railroad track past said location and producing an output signal proportional to the heat emitted by said journal boxes; threshold means coupled to the output of said heat responsive means, for producing an output signal when the output signal of said heat responsive means exceeds a predetermined value indicating an abnormally high temperature in a journal box of said train; stepping switch means, coupled to the output of said threshold means, and having a plurality of output conductors for producing thereon output signals one at a time in time sequence in response to output signals from said threshold means; axle pickup means mounted in the neighborhood of and responsive to the presence of a train axle for producing an output signal when a train axle passes by said location; a plurality of axle counter means coupled to corresponding output conductors of said stepping switch means, for producing an output signal signifying the total number of axles between the corresponding abnormally hot journal box and one end of said train; a multiple channel vocal output message generator for producing a plurality of verbal output signals including predetermined words and numbers; output message switching means, coupled to the output of said vocal output message generator, for coupling predetermined output channels onto an output conductor in response to control signals applied to said output message switching means; output message selection means coupled between said output message switching means and each of said axle counter means, for applying control signals to said output message switching means to select a time sequence of output words and numbers indicating the presence of an abnormally hot journal box and the total number of axles between said abnormally hot journal box and one end of said train; a sync signal generator coupled to said vocal output message generator, for producing sync output signals which are correlated in time with the output word and message number signals of said vocal output generator; output timing means, coupled to said sync signal generator, for producing a sequence of time interval signals correlated with the word and number output message signals of said vocal output message generator, said output timing means being coupled to said output message selection means to synchronize the operation thereof with the operation of said vocal output message generator to produce a substantially continuous output message signal on said output conductor; output stepping switch means coupled between said output timing means and each of said axle counter means for coupling the output signal of each of said axle counter means to said output message selection means in time sequence to produce a plurality of output messages each indicating the presence and location of a corresponding abnormally hot journal box.

14. The combination defined in claim 13 wherein said vocal output message generator comprises a multiple channel tape recorder containing a plurality of magnetic tape loops and a magnetic readout head associated with each of said tape loops, said tape recorder containing tape drive means for driving all of said tape loops past their associated readout head in synchronism, and wherein said sync signal generator comprises a sequence of synchronizing signals recorded on one of said tape loops and signal receiving means coupled to the readout head associated with said one tape loop; and wherein said output timing means comprises a plurality of timing switch elements coupled to said signals receiving means, and means for activating said switch elements one at a time in time sequence in response to said synchronizing signals to define a sequence of adjacent time interval signals; and wherein said output mesage switching means comprises a plurality of output switching elements each coupled between a corresponding readout head of said tape recorder and said output conductor, each of said output switching elements being coupled to said output message selection means, for actuation thereby in accordance with a predetermined sequence to couple predetermined channels of said tape recorder to said output conductor in predetermined time intervals.

15. The combination defined in claim 14 wherein each of said axle counter means comprises a plurality of stepping switches each containing a movable contact and ten stationary contacts; a counter stepping circuit mechanically coupled to the arm of each of said stepping switches, for advancing the arms of said stepping switches from one stationary contact to the next in response input signals from said axle pickup means thereby representing by the position of said movable arms the total number of input signals received after said counter stepping circuit has been enabled, the position of one movable arm representing the units digit of said total number and the position of a second movable arm representing the tens digit of said total number and so on; means for enabling said counter stepping circuit by the corresponding output signal of said threshold means; ten output conductors coupled respectively to the stationary contacts of each stepping switch, each output conductor of each axle counter means being coupled to a corresponding one of ten bus conductors and each bus conductor being coupled to a corresponding one of said output switching elements for activating each of said output switching elements when an enabling signal is applied to the corresponding bus conductor; a plurality of output enable conductors each coupled to the movable arms of the stepping switches in a corresponding axle counter means; a timing switch element coupling each of said output enable conductors in parallel to said movable arms; arms and means for coupling said timing switch elements to said output timing means to activate said timing switch elements one at a time in a sequence of adjacent time intervals, and wherein said output stepping switch means comprises means for applying an output enabling signal to said output enable conductors one at a time in sequence in response to the output signals of said output timing means, said output stepping switch means switching from one output enable conductor to the next at the end of a predetermined number of time intervals which include the said sequence of adjacent time intervals in which the timing switch elements of each of said axle counter means are activated.

16. The combination defined in claim 15 wherein said heat responsive means includes two heat responsive elements mounted in said location on opposing sides of said railroad track, each of said heat responsive elements receiving heat from journal boxes of a train passing by said location on the corresponding side of said track for producing an output signal proportional to the heat emitted by said journal boxes; and wherein said threshold means includes means for producing a first output signal signifying the presence of an abnormally hot journal box on one side of said train and a second output signal signifying the presence of an abnormally hot journal box on the other side of said train; and further comprising information storage means coupled to said threshold means, and responsive to said first and second output signals of said threshold means for signifying on which side of the train a hot box has occurred, said information storage means being coupled to said output message selection means and to said output timing means and to said output stepping switch means, and means including said output stepping switch means for energizing said signal storage means in synchronism with said axle counter means to identify the side of the train associated with each abnormally hot journal box whose position is recorded on the stepping switches of a corresponding axle counter means.

17. The combination defined in claim 16 wherein said information storage means comprises a first and a second storage switch element associated with each of said axle counter means, each of said storage switch elements being coupled to said threshold means via said input stepping switching means and being activated when the counter stepping circuit of the associated axle counter means is enabled, one of said storage switch elements being responsive to said first output signal of said threshold means and the other storage switch element being responsive to said second output signal of said threshold means; an output conductor coupled between one terminal of each of said storage switch elements and a corresponding output switching element; a storage output enable conductor coupled to the other terminal of each pair of storage switch elements associated with a given axle counter means; a time switching element coupled in series with each of said storage output enable conductors, each of said time switching elements being coupled to said output timing means for activation in a time interval outside of said sequence of adjacent time intervals in which the time switching elements associated with said axle counter means are activated, and means including said output stepping counter means for applying an output enable signal to each of said storage output enable conductors in time sequence in synchronism with said output enable signal applied by said output stepping counter to the output enable conductors of said axle counter means.

18. The combination defined in claim 17 wherein said synchronizing signals recorded on said tape loop of said tape recorder comprise a plurality of different tone frequencies recorded on said tape loop in accordance with a predetermined code which uniquely identifies different intervals on said tape loop, and wherein said synchronizing signal receiving means comprises a plurality of tuned tone detectors each tuned to the frequency of one of said tones for producing an output signal in response to the corresponding tone, and wherein said output timing means contains a decoder for decoding the output signals of said tone detectors in accordance with said predetermined code to produce output signals corresponding to the different intervals on said tape loop.

19. In a hot box detector circuit for detecting abnormally hot journal boxes in a railroad train and for determining the location of said abnormally hot journal boxes, the improvement comprising a vocal output message generator for producing a plurality of verbal output signals including predetermined words and numbers; output message selection means coupled to said vocal output message generator for controlling the output of said vocal output message generator and select a time sequence of output words and numbers signifying the presence and the location of an abnormally hot journal box; signal storage means coupled to said output selection means, for receiving and storing signals from said hot box detector circuit representing the presence and the location of an abnormally hot journal box; output control means coupled to said output message selection means for initiating a time sequence of output words and numbers corresponding to the signals stored in said signal storage means; and means for activating said output control means in response to the passage of a railroad train in the neighborhood of said hot box detector circuit.

References Cited by the Examiner

UNITED STATES PATENTS

| | | | |
|---|---|---|---|
| 2,435,066 | 1/1948 | Barsh | 179—100.1 |
| 2,444,818 | 7/1948 | Franklin | 179—100.3 |
| 2,488,840 | 11/1949 | Wells | 179—100.3 |
| 2,826,685 | 3/1958 | Luft | 246—34 |
| 2,963,575 | 12/1960 | Pelino et al. | 246—169 |
| 3,008,042 | 11/1961 | Phelps | 246—182 X |
| 3,015,702 | 1/1962 | Vogel et al. | 179—100.2 |

ARTHUR L. LA POINT, *Primary Examiner.*

LEO QUACKENBUSH, EUGENE G. BOTZ, *Examiners.*

UNITED STATES PATENT OFFICE
CERTIFICATE OF CORRECTION

Patent No. 3,226,540                          December 28, 1965

Joseph R. De Priest

It is hereby certified that error appears in the above numbered patent requiring correction and that the said Letters Patent should read as corrected below.

Column 13, line 19, after "of" insert -- said location --; line 72, for "signals" read -- signal --; column 14, line 37, strike out "arms", second occurrence.

Signed and sealed this 27th day of December 1966.

(SEAL)
Attest:

ERNEST W. SWIDER                                    EDWARD J. BRENNER
Attesting Officer                                            Commissioner of Patents